P. E. WIRT.
TIRE BODY CONSTRUCTION.
APPLICATION FILED JUNE 19, 1914.

1,228,630.

Patented June 5, 1917.
3 SHEETS—SHEET 1.

Witnesses

Inventor
Paul E. Wirt
By his Attorney

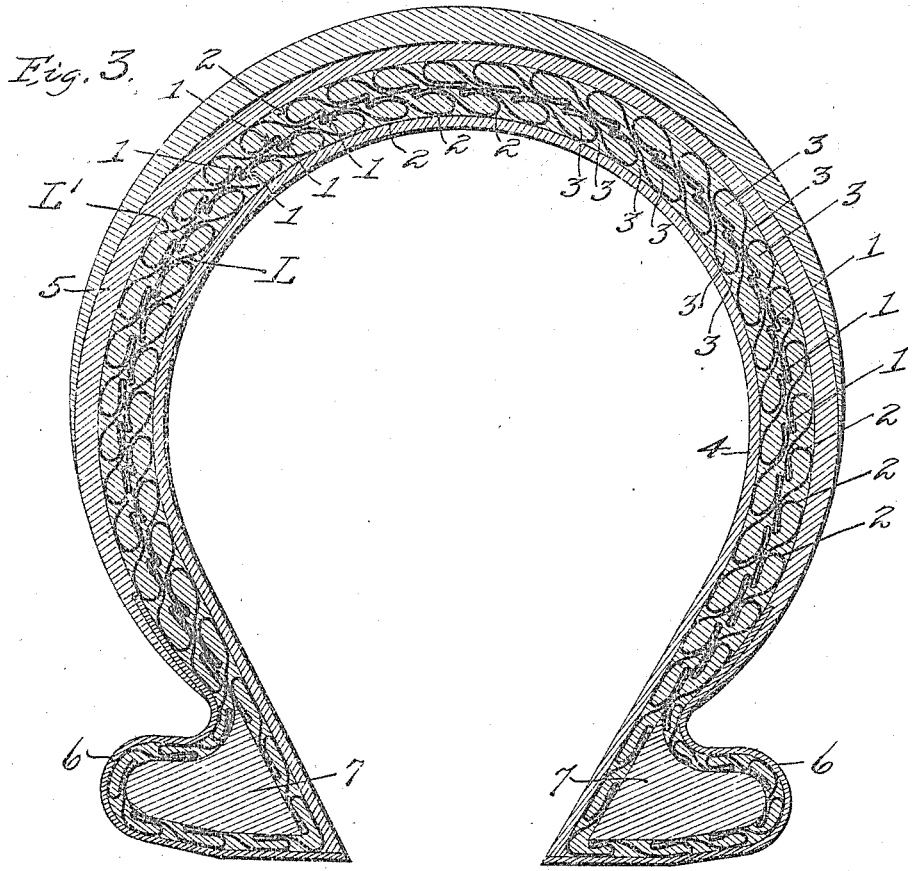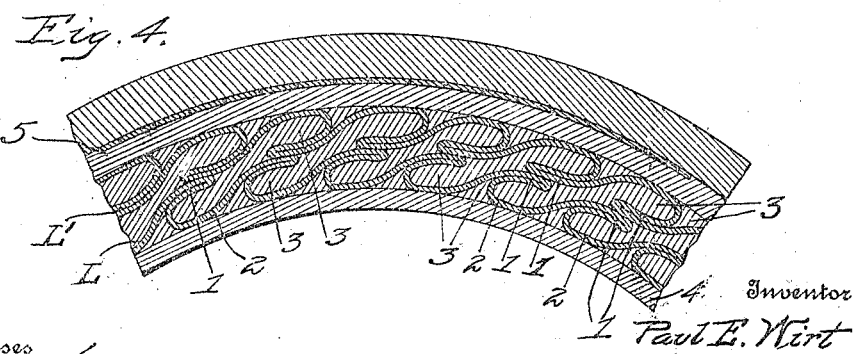

P. E. WIRT.
TIRE BODY CONSTRUCTION.
APPLICATION FILED JUNE 19, 1914.
1,228,630.
Patented June 5, 1917
3 SHEETS—SHEET 3.
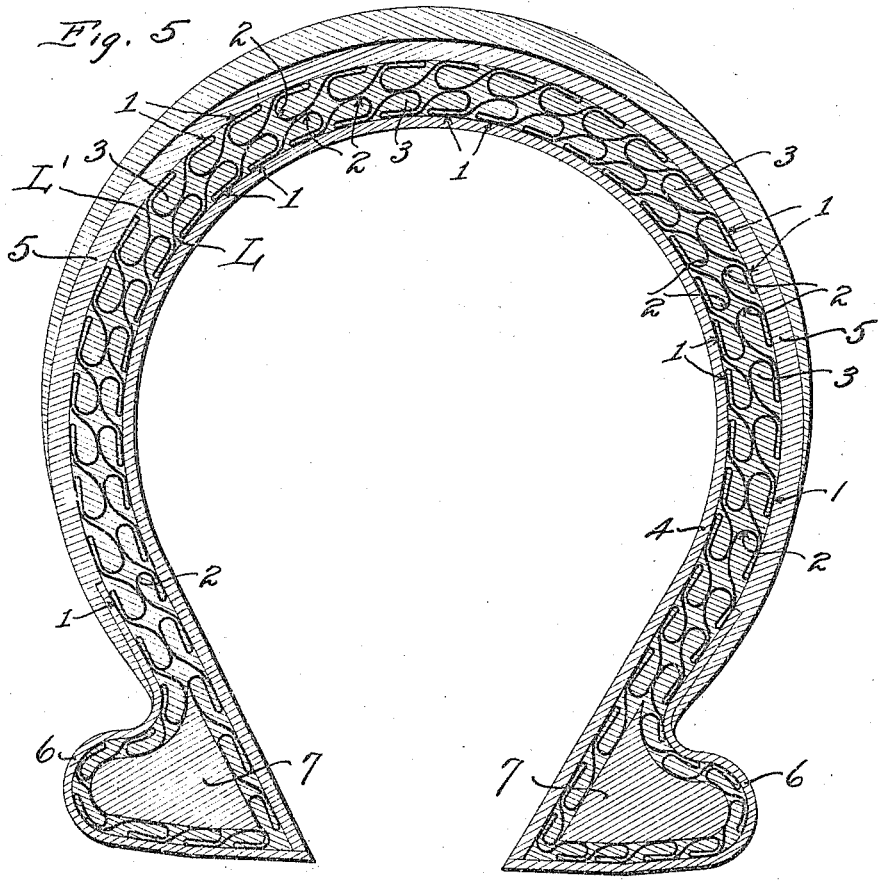
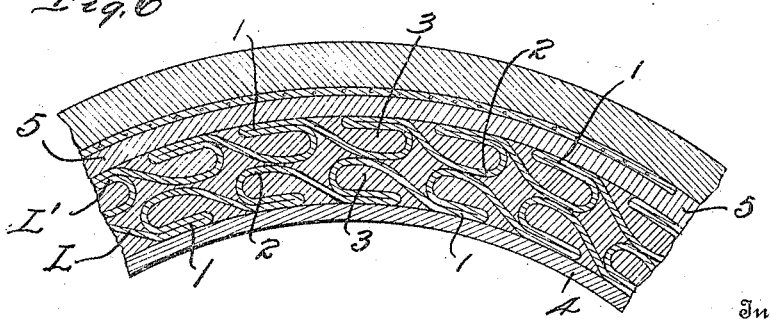
Witnesses
Inventor
Paul E. Wirt
By
his Attorney

UNITED STATES PATENT OFFICE.

PAUL E. WIRT, OF BLOOMSBURG, PENNSYLVANIA.

TIRE-BODY CONSTRUCTION.

1,228,630.	Specification of Letters Patent.	Patented June 5, 1917.

Application filed June 19, 1914. Serial No. 846,057.

*To all whom it may concern:*

Be it known that I, PAUL E. WIRT, a citizen of the United States, residing at Bloomsburg, in the county of Columbia and State of Pennsylvania, have invented certain new and useful Improvements in Tire-Body Construction, of which the following is a specification.

This invention relates to an improvement in tire body construction, and primarily has in view the employment of a novel fabric body material designed to be employed in such a manner as to provide a tire body or "carcass" possessing a maximum degree of strength, flexibility, and durability, and otherwise well adapted for withstanding the exacting requirements of modern high-powered and heavy motor cars.

Another object sought to be attained by the present invention is to not only provide a tire body or carcass construction having exceptional wearing and puncture-resisting qualities, but also one wherein ripping tendencies are greatly minimized, and a greater tractive efficiency secured than in the ordinary canvas and rubber tire.

A further object of the invention is to provide for so combining separate layers of fabric body material having closely adjacent folds with adjoining fold-walls so disposed in overlapping and other relations that a tire, embodying the same, will have the principal characteristics of a carcass made of flattened overlapping cords, and at the same the opening of the folds will be prevented, and a better "hinging" action secured at the sides of the tire than is possible with flat laid fabric, or fabric having so-called plain "vertical" folds. Accordingly, the present invention is intended to provide a construction which insures suppleness or easy hinging at the sides, prevents ripping across the folds, and gives many of the desirable characteristics of a rubberized cord tire. Furthermore, the employment of separate layers of material each having overlapping folds, and the folds of one layer being reversely related and diagonally disposed to those of the other layer, tends to securely anchor or bind together the folds in the opposite layer, promotes free and easy hinging without tendency of opening the folds, and generally secures a mutual reinforcement of the two layers in such a manner as to provide a tough and durable structure, as well as one which is strongly resistant to puncture.

With these and other objects in view which will be apparent to those familiar with the requirements of tires for motor cars, the invention consists in the novel construction, combination, and arrangement of parts as will hereinafter more fully appear.

For a full understanding of the invention, reference is to be had to the following description of the accompanying drawings, in which—

Fig. 3 is a cross sectional view of a completed tire body or carcass built up in accordance with this invention.

Fig. 4 is an enlarged detail view of a section of tire body wall to illustrate more plainly the distinctive structural characteristics of the superposed layers, namely the overlapping of the adjoining fold-walls in each layer, and the reversed and diagonal relation of the folds in one layer to those in the other layer of folded material.

Fig. 5 is a cross sectional view similar to Fig. 3 showing an optional arrangement of the superposed layers with their broad bights in juxtaposition, instead of the narrow bights in juxtaposition, as shown in Fig. 3.

Fig. 6 is an enlarged detail sectional view of a portion of the tire body wall construction as shown in Fig. 5.

Like reference characters designate corresponding parts in the several figures of the drawings.

Figure 1:
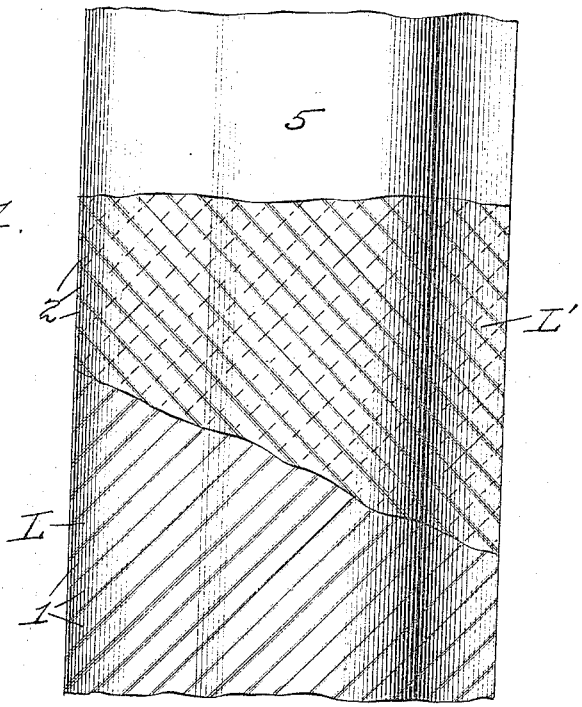
Figure 1 is a plan view of a section of a tire carcass or body constructed in accordance with this invention and showing the respective layers broken away to expose the same.

The present invention, in its preferred application, includes separate superposed layers of fabric body material of novel formation, the separate layers being respectively indicated in the drawings by the general designations L and L'. Each layer has the same structural characteristics and is made from a blank strip of rubberized fabric body-material gathered and compacted into a series of agglomerated folds which have a tumbled or upset formation. This construction may be developed and produced in accordance with the process disclosed in my former Patent No. 1,009,365, dated November 21, 1911.

By reason of the tumbled or upset formation of the folds of each layer of body-material, the adjoining fold-walls are brought into overlapping relation, and present bights which produce flexible hinges throughout for the tire-body. In this connection, it will be observed that in the preferred embodiment of the invention, as shown, the overlapping folds are of special and peculiar formation. That is to say, in producing the folded formation in each layer, the material is gathered into a series of alternating relatively narrow and broad bights 1 and 2 respectively, the narrow bights 1 all having a lateral projection or trend in one direction, and the broad bights having a lateral projection or trend in the opposite direction.

Furthermore, by reason of this characteristic fold-formation, the narrow bights 1 of each layer of body material are all disposed along or form one side of such material, while the broad bights are all disposed along or form the opposite side of such material, this being a feature of practical importance when two or more layers of this material are combined together in the manner to be presently referred to.

In addition to the special fold-formation, it will be noted that the fold walls are permanently connected by resilient tying means preferably consisting of the rubber fillings 3 between and about the fold walls and which, in effect, form rubber cords extending lengthwise of the folds, while the bights of the rubberized fabric material practically form fabric cords running in the same direction.

Figure 2:
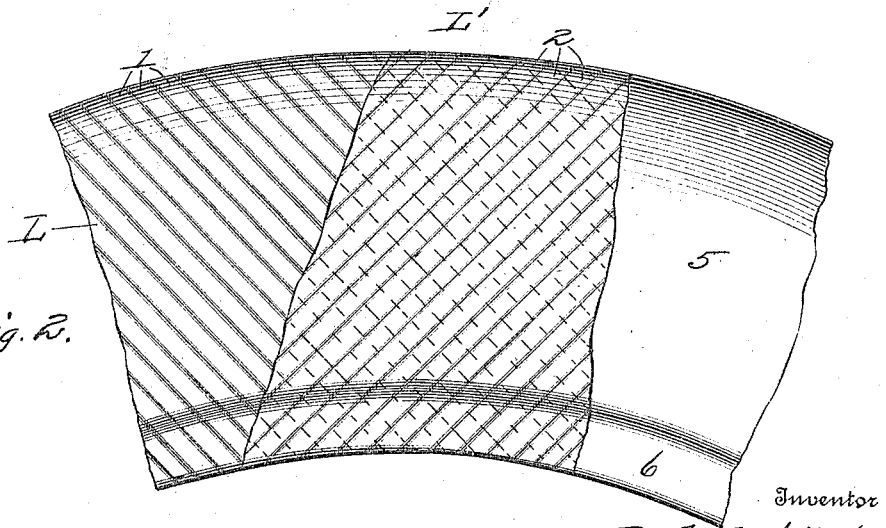
Fig. 2 is a side view of a similar character.

Another practical feature is that of having the folds in each layer of body-material extending diagonally thereof, and this becomes particularly important when two layers of such material are combined in superposed relation, as shown in the drawings. In thus combining separate layers of this material, they are so arranged as clearly indicated in Figs. 1 and 2 of the drawings, that the folds thereof extend diagonally across the tire in opposite directions, and hence crosswise with respect to each other, and as thus arranged, the two layers are firmly rolled or compressed and vulcanized together, thereby forming a practically homogeneous main body part for the tire carcass.

In addition to the folds in the separate layers being diagonally disposed with relation to each other and with relation to the tire body, the positions of the layers are reversed with respect to each other. That is to say, as shown in both Figs. 3 and 5 of the drawings, the layers are so placed that similar bights thereof are arranged in juxtaposition, and said similar bights of the two layers being furthermore disposed in overlapping relation and respectively projecting in reverse directions. This novel relation of the bights is produced by the relatively reversed positions of the two layers regardless of whether the narrow bights or the broad bights of the separate layers are brought into juxtaposition, though in the construction shown in Fig. 3 of the drawings, a little better hinging effect is provided for as well as a stronger inner bond. However, the distinctively important feature of the arrangement described resides in the relative reversal of the two layers in order that similar bights may be brought into juxtaposition, and thereby disposed in overlapping relation and respectively projecting in reverse directions with the result of presenting an extensive field of hinging points next to the inner and next to the outer walls of the tire body, thereby greatly increasing the suppleness or free hinging action thereof, particularly at the sides. At the same time, the juxtaposed and reversely disposed similar bights of the two layers provide an exceptionally strong bond between the two layers and the rest of the tire body, as well as materially contributing to that important characteristic of the improved construction wherein crosswise ripping of the fabric is greatly minimized and greater tractive efficiency attained. Furthermore, the provision of a great number of overlapping fabric layers serves to greatly improve the puncture resisting qualities of the tire.

The above described novel construction and arrangement of fabric body material may be incorporated in a tire body according to conventional processes so as to include the usual inner and outer coverings 4 and 5 respectively, and the clencher elements 6 which latter include the clencher cores 7, and combined therewith is the feature of having the separate layers of material extend into and about the clencher elements and the cores therein, thus securely anchoring the layers in and at the clencher elements.

Special advantages arise from the employment of two layers of folded fabric body material. A tire body having incorporated therein the separate layers laid diagonally across one another provides a more combining construction as a whole than one layer of folded material, and this is particularly true where the folds in each layer are upset or inclined so that the fold walls in each layer have an overlapping relation. This becomes particularly pronounced when the relation of the bights of the separate layers is taken into consideration, the said bights of the separate layers not only being disposed in overlapping relation, but also respectively projecting in reverse directions, whereby one layer acts in harmony with the other layer to secure a thorough interlocking and bonding together of the various fabric elements with the surrounding and inclosed rubber fillings, while at the same time one layer tends to correct or oppose any tendency of the other layer to open up.

The two sets of upset folds crossing each other obliquely as shown, tie the two layers together throughout in such a manner that it guards very efficiently against rupture by reason of wear, and at the same time possesses all of the advantages incident to a single folded layer of fabric, such as flexibility, resiliency, strength, resistance to wear, puncture, and the like.

By causing the folds in the superposed layers of material to extend obliquely in opposite directions, the strength and durability is enhanced owing to the reversal or crossing of the folds diagonally, one layer being firmly rolled or compressed and cemented firmly down upon the other. It will be observed that in a tire body having but one layer of the folded material, with folds disposed diagonally, the pull or circumferential stress due to traction when the tire is in use is most strongly exerted in one direction, or in other words, most largely against the ends of the folds lying in the direction in which the wheel is traveling. That is to say, there is most pull against the folds anchored in the clench at one side of the tire body lying in the direction the wheel is moving. With the doubled and crossed folds this severe traction or pull is better distributed on both sides of the tire body at the clench. Where a single folded layer of material is employed with the folds extending diagonally, the circumferential stress at the sides of the wheel adjacent the clench elements tends to pull the folds apart on one side of the wheel and push the folds together on the opposite side of the wheel, whereas, with the present construction the resistance to this stress on both sides of the tire is the same, and there is no danger of the folds being pulled apart on one side of the tire. A much more durable construction is thus provided than where merely a single layer of folded material is employed.

It may also be mentioned that in forming the "carcass" or body portion of the tire by bending the folded layers around a suitable core, the folds are more closely compacted at the sides of the tire adjacent the clench elements and a greater thickness obtained at this point, owing to the fact that the circumference is less at this point than at the tread of the tire. A greater thickness and compactness is thus obtained at the point where the stress is the greatest, the thickness gradually diminishing toward the tread. The body portion thus obtained is exceedingly flexible and resilient, owing to the fact that the various bights provide a practical continuous series of hinge members.

The construction of the improved tire body, at the clencher or bead elements is of practical importance. It will be observed from the drawings that both forms of the invention illustrated involve the feature of having the edge of both layers of the folded material enter into the construction of the clencher or bead elements to give substantiality to the latter, as well as to firmly anchor both layers of the material in the clench or bead. At the same time, the wider layer laps over the clencher core to provide the most efficient construction for strength. Consequently, it is to be understood that although the edge of one layer is not wrapped around the edge of the clencher, yet it is bound, tied, or cemented strongly to it so as to constitute an integral part of the bead or clench.

I claim:

1. A tire body including separate superimposed sheets of fabric material having upset overlapping folds, the said upset folds in the separate layers of material being arranged in juxtaposition and disposed obliquely in diagonally crossing relation, and a rubber bond tying together the two layers and filling the bights thereof.

2. A tire body including separate superposed layers of fabric material having overlapping folds whose alternate bights respectively project in opposite direction, the folds in one layer having an inverted relation to and crossing the folds in the other layer.

3. A tire body including separate superposed layers of fabric material having overlapping folds presenting a series of alternate narrow and broad bights respectively projecting in opposite directions, the folds in one layer having an inverted relation to and crossing the folds in the other layer.

4. A tire body including superposed layers of fabric strips, each strip having a close succession of folds with adjoining fold walls disposed in overlapping relation, and the folds presenting a series of alternating relatively narrow and broad bights, the said separate layers of folded fabric strips being arranged in reversed relation to each other to bring similar bights thereof in juxtaposition and overlapping relation.

5. A tire body including superposed layers of fabric strips, each strip having a close succession of folds with adjoining fold walls disposed in overlapping relation, and the folds presenting a series of alternating relatively narrow and broad bights, the said separate layers of fabric strips being arranged in reversed relation to each other to respectively dispose the broad bights of the inner layer next to the inner wall of the tire body, and the broad bights of the outer layer next to the outer wall of the tire body.

In testimony whereof I hereunto affix my signature in the presence of two witnesses.

PAUL E. WIRT.

Witnesses:
C. W. FUNSTON,
PAUL A. KNORR.